J. C. CALVIN, DEC'D.
J. S. CALVIN, ADMINISTRATRIX.
CLUTCH DEVICE.
APPLICATION FILED AUG. 5, 1909.

1,103,560.

Patented July 14, 1914.

WITNESSES:
Walter A. Kelly
Othel A. Kelly

INVENTOR
John C. Calvin
BY
ATTORNEY.

THE NORRIS PETERS CO., WASHINGTON, D. C.

UNITED STATES PATENT OFFICE.

JOHN C. CALVIN, OF BUFFALO, NEW YORK; JANET S. CALVIN ADMINISTRATRIX OF SAID JOHN C. CALVIN, DECEASED.

CLUTCH DEVICE.

1,103,560.  Specification of Letters Patent.  Patented July 14, 1914.

Application filed August 5, 1909. Serial No. 511,397.

*To all whom it may concern:*

Be it known that I, JOHN C. CALVIN, a citizen of the United States of America, residing at Buffalo, county of Erie, and State of New York, have invented a certain new and useful Clutch Device, of which the following is a full, clear, and exact description.

My invention relates generally to friction clutches as used on motor cycles and more particularly as used on those motor cycles which are equipped with the ordinary yieldable sprocket wheel.

In producing my invention I have sought to provide a clutch of a simple construction by which the cyclist shall have perfect control over his machine at all times; also to provide a clutch device so sensitive that a very gradual increase or decrease of power may be transmitted through it at the will of the operator without causing any sudden jerk by the engagement of the friction members thereof. The clutch may remain in any predetermined position causing any desired degree of pressure between the friction surfaces and thereby affording means for obtaining any desired constant yieldable drive. Moreover my device when applied to a motor cycle will allow a free movement of the engine while the machine remains still and also will allow the machine to be moved along without moving the engine.

I have attained the advantages above set forth by the device herein described but many other advantages resulting from its use will be evident from this specification to those skilled in the art.

Figure 1:
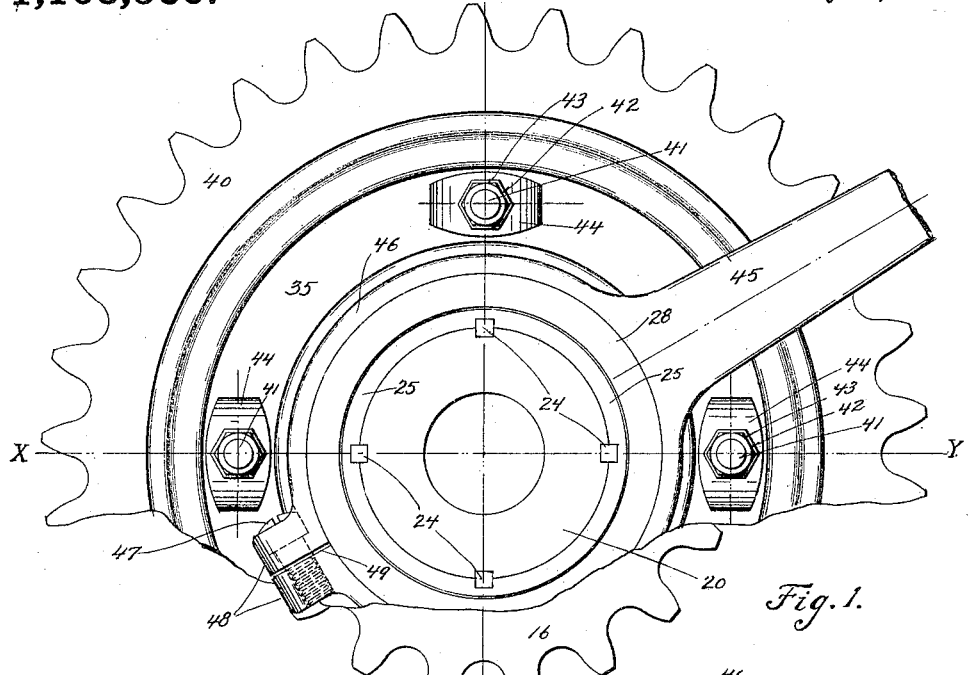
Figure 2:
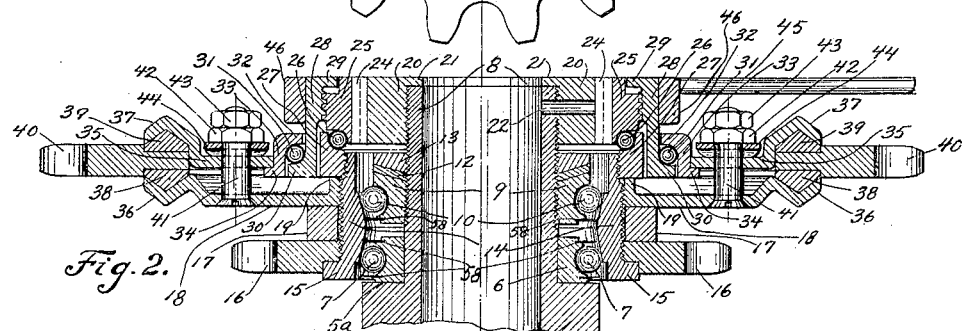
Figure 3:
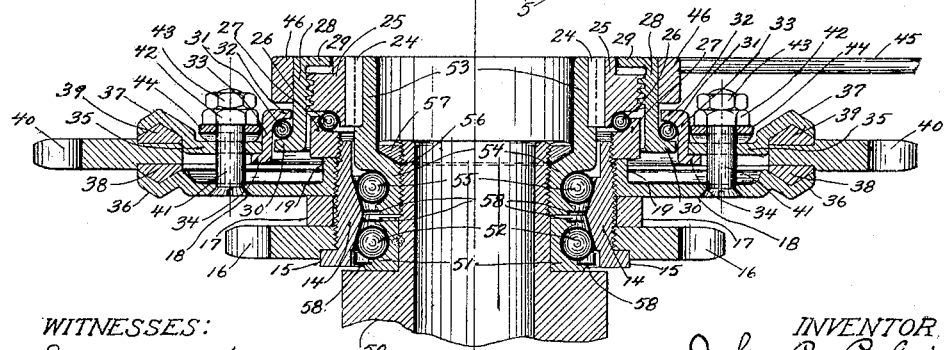

In the accompanying drawings, forming part of this specification, similar characters of reference indicate similar parts throughout the several views in which:

Figure 1 is an elevation of my invention showing it applied to the compensating sprocket of a motor cycle. Fig. 2 is a sectional view taken on the line X—Y of Fig. 1. Fig. 3 is a similar sectional view of a modified form of my invention.

The hub shell 5 (Fig. 2) carried by the frame of the machine, supports all of the mechanism of the clutch device. To the hub shell 5 and up against its shoulder 5ª is secured a ball ring 6 which retains a plurality of balls 7. The hub shell 5 is exteriorly screw-threaded to a considerable length at its outer end 8. To the threaded portion of the hub shell 5 is secured, by a corresponding interior screw-thread, the ball cup or race 9 which retains the balls 10 and which provides adjusting means for both series of balls 7 and 10. In close contact with the flat face of the ball cup 9 and carried by the hub shell 5 is a lock washer 12. A lock nut 13, screw-threaded to the hub shell 5 is adapted to be screwed down on top of the lock washer 12. The lock washer 12 and lock nut 13 form means for securely locking the ball cup 9 in position after it has been properly adjusted.

Placed over the two series of balls 7 and 10 and forming a cone for both said series of balls is an annular cone ring 14 which is exteriorly screw-threaded and provided with a shoulder 15. Screwed in place on the annular cone ring 14 is a sprocket wheel 16 recessed in one side to fit over the flange 15 of the cone ring 14 and a spacing ring 17.

18 is an inner friction plate which is provided with a hub 19, secured to the annular cone ring 14 up against the spacing ring 17, by means of an interior screw-thread.

20 is a recessed annular ring interiorly screw-threaded and adapted to fit over the outer end 8 of hub shell 5.

The inwardly projecting flange 21 of the annular ring 20 is brought up tightly against the outer face of the end 8 of the hub shell 5 and is securely locked in this position by the pin 22 which prevents any further rotation between these two parts. Around the periphery of the recessed annular ring 20 are key seats into which are securely inserted the keys 24.

25 is a slidable thrust ring which is provided with the same number of key seats as is the annular ring 20 and is adapted to slip over said ring 20 and its keys 24 in a manner which will allow a free lateral movement thereof. A portion of the periphery of the slidable thrust ring 25 is provided with a screw-thread of any style but preferably with a square or an acme thread. The inner face of the slidable thrust ring 25 is of such a conformation as to form a cone for a plurality of balls 26 and it holds the balls 26 in their place in the cup ring 27. The cup ring 27 is interiorly screw-threaded and is adapted to fit over the outer end of the annular cone ring 14 and also acts to lock the inner friction plate 18 in place.

Screw-threaded over the slidable thrust ring 25 is an annular ring 28 provided at its outer end with an inwardly projecting flange 29. The flange 29 overlaps the screw-threaded portion of the slidable thrust ring 25, the said ring 25 having a reduced peripheral diameter at its outer end of an ample length to allow a free revolution of the ring 28 and a sufficient space to take up wear on the clutch members 38 and 39. Such wear is taken up by gradually screwing inwardly the annular ring 28 until the balls 31 are relieved from the pressure of the springs 44. The ring 28 is further provided at its inner end with an outwardly projecting flange 30 on the upper face of which is formed a ball cup for a plurality of balls 31. The flange 30 and the inwardly projecting flange 32 form a bearing for the annular cone ring 33. At the inner end of the cone ring 33 is an outwardly projecting flange 34.

35 is the outer friction plate which is provided with a central opening of sufficient diameter to slip over the periphery of the cone ring 33 and rest on the flange 34 of said cone ring 33.

At the outer rim portion of the friction plates 18 and 35 are formed V-shaped female clutch members 36 and 37 in contact with which are the like V-shaped male clutch members 38 and 39 which are made of any anti-friction material and are securely fastened to the recessed sides of the driving sprocket 40.

It is to be understood that the specific form of the clutch members last above described and of the driving sprocket and its position on the motor cycle are of no immediate importance in this invention but that equivalent forms of friction members and other positions of the driving sprocket wheel 40 may be employed with the same results as those herein described. I do not therefore wish to limit my invention to the specific form of driving sprocket wheel and clutch members which are herein illustrated and described. The friction plates 18 and 35 are prevented from relative rotation by the tension bolts 41, which may be of any suitable number and which are passed up through both plates from the inner side of the inner plate 18. The tension bolts 41 are each provided at their outer ends with a nut 42 and a lock nut 43. Over each bolt and beneath the bottom of the nuts 42 is placed a spring 44. The springs 44 bear against the outer side of the outer friction plate 35 and by means of the bolts 41 they tend to draw the said friction plates together thereby causing a friction between the clutch members. These springs are set to the full working power of the engine, adjustments being made by means of tension bolts 41, nuts 42, and lock nuts 43.

45 is the clutch operating lever (shown broken off in the drawings) which at its upper or operating end is furnished with a suitable and convenient handle and is of sufficient length to be easily reached by the rider.

At the lower end of the lever 45 is formed a ring 46 which encircles the periphery of the annular ring 28 and is adjustably fastened thereto by means of the screw 47 which passes through a lug 48 made integral with the ring 46 and which is slotted at 49.

At some point on the machine not shown on the drawing, a stop is provided for the lever 45 which stops the said lever from further rotation when the clutch has been thrown in, thus releasing the series of balls 26 and 31 from the pressure of the springs 44.

58 are dust shield rings and ball retainers which are slipped in place in annular grooves provided in the ball cup 9 and ball ring 6.

In the modified form of my invention shown in Fig. 3 the numeral 50 represents the hub shell and is here shown of a length which is ordinarily furnished with motor cycles. 51 is the ball ring which retains a plurality of balls 52. 53 is a cup ring provided at its inner end with an interiorly screw-threaded hub 54. The outer periphery of said hub 54 is of such a conformation as to form a ball cup for a plurality of balls 55 while the inner face of said hub is made sloping to accommodate the lock washer 56 and the lock nut 57. The cone ring 14 as in the other form of my device forms the cone for both series of balls 52 and 55 and the adjustments of said series of balls are made by means of the cup ring 53. 58 are dust shield rings and are slipped in annular grooves provided in the ball ring 51 and the hub 54 of the cup ring 53. The outer end of the ring 53 is provided with key seats cut in its periphery in which are set keys 24. The slidable thrust ring 25 is key-wayed and is adapted to slip freely over the cup ring 53 and its keys 24.

In order that a right idea of the operation of my invention may be had, it will be well at this point to distinguish between the stationary and the movable parts. The annular cone ring 14 carries the sprocket wheel 16, the spacing ring 17 and the cone ring 27. Secured also to the annular cone ring 14 is the inner friction plate 18, which, by means of the tension bolts 41 with their springs 44 nuts 42 and lock nuts 43, carries with it the annular cone ring 33 and the outer friction plate 35. Between the said friction plates are carried the friction members 38 and 39 secured between which is the driving sprocket wheel 40. These parts form the rotating or power transmitting parts of my device and have their bearing formed by the four series of balls 7, 10, 26 and 31 in Fig. 2 or 52, 55, 26 and 31 in Fig. 3. The hub shell 5 (Fig. 2) is rigidly secured to the frame of the machine and supports in a rigid manner the ball ring 6, the ball cup 9, the lock washer 12, and the lock nut 13. At the outer end of the hub shell 5 is also secured in a rigid manner the ring 20 by means of its interior screw-thread and the pin 22. In Fig. 3 the hub shell 50 supports in a rigid manner the ball ring 51, the cup ring 53, the lock washer 56 and the lock nut 57. The slidable thrust rings 25 have lateral motion only while the annular rings 28 each with the operating lever 45 have only a limited circular motion depending upon the pitch of the screw-threads on the interior of said rings.

Having thus described the different parts of my clutch I will now describe its operation.

The clutch members of my invention always remain in engagement except when manually disengaged. For the above reason the springs 44 on the tension bolts 41 are set by means of the nuts 42 and lock nuts 43 to cause a pressure between the friction plates 18 and 35 sufficient to produce ample friction between the clutch members so that the full power of the engine will be transmitted through them. When it is desired to throw the clutch out of engagement or to decrease the amount of power transmitted through it the operating lever 45 is moved in a counter clockwise direction if the screw-threads on the slidable thrust rings 25 are right-handed, or in a clockwise direction if such screw-threads be left-handed. As the lever 45 carrying the annular ring 28 is operated to disengage the clutch it imparts by means of the interior screw-threads on said ring, to the slidable thrust ring 25 an inward lateral motion and thrusts the cone portion of said ring against the series of balls 26. When the slidable thrust ring 25 has reached its maximum inward travel, the annular ring 28, as it continues to revolve with the operating lever 45 moves in an outward lateral direction. The annular rings 28 have a bearing by means of the series of balls 31 against the upper flange 32 of the annular cone rings 33. Thus when the annular rings 28 move in an outward lateral direction, they carry the annular cone rings 33 in the same direction and, as the outer friction plate 35 rests upon the outer surface of the lower flange 34 of said cone rings, the said friction plates have the same amount of lateral movement. Thus it will be seen that when operating the clutch to disengage its friction members, the thrust which is caused by the tension placed on springs 44 is equally balanced since the inward thrust is taken up against the series of balls 31 and the outward thrust against the series of balls 26. Thus the series of balls 7 and 10 (Fig. 1) or 52 and 55 (Fig. 2) of the main bearing are thereby relieved of any lateral thrust since all of the same is distributed between the series of balls 31 and 26 and the other parts of my clutch device immediately connected thereto. The relative lateral movement between the two series of balls 31 and 26 causes an expansion between the friction members thereby allowing a slippage to occur between the friction members 37 and 39 and 36 and 38 of the clutch. The amount of slippage between such clutch members is governed by the operating lever and gradually increases until the operating lever allows the driving sprocket wheel 40 to revolve independently of the sprocket wheel 16. When it is desired to engage the clutch members it is only necessary to move the lever 45 in the opposite direction, whereupon the annular ring 28 will, through the medium of the screw-thread on the interior of said ring allow the spring 44 to exert a gradually increasing pressure until the lever 45 is back in its normal position. When the said lever is back in its normal position the said springs will draw the friction plates together with the same pressure to which they were previously set and the slidable thrust ring 25 will be relieved of its thrust against the balls 26 and the annular ring 28 will be relieved of its thrust against the balls 31.

By the use of my clutch it is possible for the rider to start his engine while standing by the side of the machine and when he desires he may mount and bring the machine from a position of rest up to full speed as gradually or rapidly as desired without being obliged to pedal. Thus the rider has the same control over his machine as the driver of an automobile. It is possible with my clutch to start the engine free and gradually apply the load up to its maximum. This is a point of great advantage and so far as I know cannot be accomplished with any of the present day motor cycles. In passing through a crowded thoroughfare the cyclist may by means of my clutch, maintain a very slow speed, regardless of the speed of his engine, and in a case of emergency, he may throw his engine out of action entirely. In rounding sharp corners with the ordinary motor cycle it is of course necessary to run slow, many times at a speed so slow that the engine cannot work at all, whereupon it is necessary to pedal to again bring the engine to the proper working speed. This all becomes unnecessary when my clutch is used as the machine may be brought to a standstill if necessary and immediately speeded up again without slowing down the engine.

From the foregoing it will be evident that some modifications of my invention may be made without departing from the spirit thereof and without sacrificing the many advantages herein set forth and those that will be evident from this specification to those skilled in the art. I do not therefore wish to be confined to the exact forms of my invention herein shown and described.

Having thus described my invention what I claim is:

1. A yieldable clutch comprising a driving sprocket wheel, a driven sprocket wheel, friction members normally engaging said driving sprocket wheel, means uniting one of said friction members with said driven sprocket wheel, adjustable spring-tension means for yieldably holding said friction members in engagement with said driving sprocket wheel and manually movable separating means interposed between said friction members for holding said members out of engagement.

2. A yieldable clutch comprising a driving sprocket wheel, a driven sprocket wheel, a bearing hub, friction members engaging said driving sprocket wheel, means uniting one of said friction members with said driven sprocket wheel, means for placing said friction members under any desired predetermined tension, a slidable thrust ring mediately connected with said bearing hub and capable of lateral movement, a cup ring between one of said friction members and said slidable thrust ring for taking the thrust of said thrust ring, screw-threaded connecting means between said slidable thrust ring and one of said friction members and manually operative means for moving said connecting means laterally, whereby the tension on said friction members may be increased or decreased as desired.

3. A yieldable clutch comprising a driving sprocket wheel, a driven sprocket wheel, friction members engaging said driving sprocket wheel, means uniting one of said friction members with said driven sprocket wheel, means for placing said friction members under any desired predetermined tension, a slidable thrust ring capable of lateral movement, a cup ring between one of said friction members and said slidable thrust ring for taking the thrust of said thrust ring, an annular ring screw-threaded to said slidable thrust ring, means engaging said annular ring and one of said friction members and manually operative means for moving said annular ring laterally, whereby the tension on said friction members may be increased or decreased as desired.

4. A yieldable clutch comprising a driving sprocket wheel, a driven sprocket wheel, a bearing hub, friction members engaging said driving sprocket wheel, means uniting one of said friction members with said driven sprocket wheel, means for placing said friction members under any desired predetermined tension, a slidable thrust ring capable of lateral movement and mediately united with said bearing hub, a cup ring between one of said friction members and said slidable thrust ring for taking the thrust of said thrust ring, an annular ring screw-threaded to said slidable thrust ring, a series of balls engaged by said annular ring, an annular cone ring engaging said series of balls and also engaging one of said friction members and manually operative means for moving said annular ring laterally, whereby the tension on said friction members may be increased or decreased as desired.

5. A yieldable clutch comprising a driving sprocket wheel, a driven sprocket wheel, a bearing hub, friction members engaging said driving sprocket wheel, means uniting one of said friction members with said driven sprocket wheel, means for placing said friction members under any desired predetermined tension, a slidable thrust ring mediately connected with said bearing hub and capable of lateral movement, a cup ring between one of said friction members and said slidable thrust ring for taking the thrust of said thrust ring, screw-threaded means connecting said slidable thrust ring and one of said friction members, an operating lever connected with said screw-threaded connecting means, whereby the tension on said friction members may be increased or decreased as desired.

6. A yieldable clutch comprising a driving sprocket wheel, a driven sprocket wheel, a bearing hub, friction members engaging said driving sprocket wheel, means uniting one of said friction members with said driven sprocket wheel, means for placing said members under any desired predetermined tension, a slidable thrust ring mediately connected with said bearing hub and capable of lateral movement, a cup ring between one of said friction members and said slidable thrust ring for taking the thrust of said thrust ring, connecting means between one of said friction members and screw-threaded to said slidable thrust ring, an operating lever, a split ring integral with said operating lever for engaging said connecting means, whereby the tension on on said friction members may be increased or decreased as desired.

7. A yieldable clutch comprising a driving sprocket wheel, a driven sprocket wheel, a bearing hub, friction members engaging said driving sprocket wheel, means uniting one of said friction members with said driven sprocket wheel, means for placing said friction members under any desired predetermined tension, a slidable thrust ring capable of lateral movement and mediately united with said bearing hub, a cup ring between one of said friction members and said slidable thrust ring for taking the thrust of said thrust ring, an annular ring screw-threaded to said slidable thrust ring, an anti-friction thrust bearing disposed between said cup ring and said thrust ring for said slidable thrust ring, means for engaging said annular ring with one of said friction members and manually operative means for moving said annular ring laterally, whereby the tension on said friction members may be increased or decreased as desired.

8. A yieldable clutch comprising a driving sprocket wheel, a driven sprocket wheel, a bearing hub, friction members engaging said driven sprocket wheel, means uniting one of said friction members with said driving sprocket wheel, means for placing said friction members under any desired predetermined tension, a slidable thrust ring capable of lateral movement, keys for mediately uniting said slidable thrust ring with said bearing hub, an annular ring screw-threaded to said slidable thrust ring, means engaging said annular ring with one of said friction members and manually operative means for moving said annular ring laterally, whereby the tension on said friction members may be increased or decreased as desired.

9. A yieldable clutch comprising a driving sprocket wheel, a driven sprocket wheel, a bearing hub, friction members engaging said driven sprocket wheel, means uniting one of said friction members with said driving sprocket wheel, means for placing said friction members under any desired predetermined tension, a slidable thrust ring mediately connected with said bearing hub and capable of lateral movement and mediately united with said bearing hub, screw-threaded connecting means between said slidable thrust ring and one of said friction members and means for limiting the inward lateral movement of said connecting means.

10. A yieldable clutch comprising a driving sprocket wheel, a driven sprocket wheel, a bearing hub, friction members engaging said driven sprocket wheel, means uniting one of said friction members with said driving sprocket wheel, means for placing said friction members under any desired predetermined tension, a slidable thrust ring capable of lateral movement and mediately united to said bearing hub, an annular ring screw-threaded to said slidable thrust ring, connecting means between said annular ring and one of said friction members, manually operative means for moving said annular ring laterally and means for limiting the inward lateral movement of said annular ring, whereby the tension on said friction members may be increased or decreased as desired.

11. A yieldable clutch comprising a driving sprocket wheel, a driven sprocket wheel, a bearing hub, friction means engaging said driven sprocket wheel, means uniting one of said friction members with said driving sprocket wheel, means for placing said friction members under any desired predetermined tension, a slidable thrust ring capable of lateral movement and mediately united with said bearing hub, an annular ring screw-threaded to said slidable thrust ring, a series of balls engaged by said annular ring, an annular cone ring engaging said series of balls and one of said friction members, manually operative means for moving said annular ring laterally and means for limiting the inward lateral movement of said annular ring, whereby the tension on said friction members may be increased or decreased as desired.

12. A yieldable clutch comprising a driving sprocket wheel, a driven sprocket wheel, a bearing hub, friction members engaging said driven sprocket wheel, means uniting one of said friction members with said driving sprocket wheel, means for placing said friction members under any desired predetermined tension, a slidable thrust ring capable of lateral movement and mediately united to said bearing hub, an annular ring screw-threaded to said slidable thrust ring, a series of balls engaged by said annular ring, an annular cone ring engaging said series of balls and one of said friction members, an operating lever, a split ring integral with said operating lever and engaging said annular ring and means for limiting the inward lateral movement of said annular ring, whereby the tension on said friction members may be increased or decreased as desired.

13. A clutch comprising a driving sprocket wheel, a driven sprocket wheel, main bearings for said sprocket wheels, normally engaged friction members, spring-tensioned means for yieldably engaging said driving sprocket wheel and friction members, manually movable separating means interposed between said friction members for holding said members out of engagement with said driving sprocket wheel and means for balancing the thrust produced by said spring-tensioned means when said friction members are moved into and out of engagement with said driving sprocket wheel, whereby said main bearings are relieved from all lateral thrusts which may be caused by the operation of said clutch.

14. A clutch comprising a driving sprocket wheel, a driven sprocket wheel, main bearings for said sprocket wheels, normally engaged friction members, spring-tensioned means for yieldably engaging said driving sprocket wheel and said friction members, manually movable separating means interposed between said friction members for holding said members out of engagement with said driving sprocket wheel, and means for balancing the thrust produced by said spring-tensioned means when said friction members are moved into and out of engagement with said driving sprocket wheel, comprising a slidable thrust ring, whereby the said main bearings are relieved from all lateral thrusts which may be caused by the operation of said thrust.

In testimony whereof, I have hereunto set my hand in the presence of two witnesses.

JOHN C. CALVIN.

Witnesses:
J. WM. ELLIS,
ETHEL A. KELLY.

Copies of this patent may be obtained for five cents each, by addressing the "Commissioner of Patents, Washington, D. C."